United States Patent Office 3,510,927
Patented May 12, 1970

3,510,927
METHOD FOR MAKING BEARING WITH SEAL
Paul W. Leak, Simsbury, Conn., assignor, by mesne assignments, to Industriewerk Schaeffler O.H.G., a partnership of Germany
Continuation of application Ser. No. 541,838, Apr. 11, 1966. This application Feb. 4, 1969, Ser. No. 798,261
Int. Cl. B23p 11/00
U.S. Cl. 29—148.4                                    3 Claims

ABSTRACT OF THE DISCLOSURE

A method for making a needle roller bearing in which the outer shell is formed with a radially extending integral flange. An elastomeric seal having a hardened insert bonded in place is positioned adjacent to the flange with the hardened insert presenting a riding surface to the ends of the needle rollers or the cage thereof.

---

This application is a continuation of application Ser. No. 541,838, filed Apr. 11, 1966, now abandoned.

This invention relates to a bearing having a seal and more particularly, relates to a method for making a sealed needle roller bearing.

More specifically, this invention relates to a method for making a bearing seal having means to retain or locate the cage or rollers of a needle roller bearing while providing an efficient seal.

Briefly this invention comprises a needle roller bearing or other bearing having an outer shell or race with or without a cage to retain the rollers in position. The ends of the outer race are turned inwardly to provide a flange. Between the flange and the cage, a rubber seal is positioned having a bonded-in-place metal insert which is closely adjacent to and retains the ends of the rollers. When a cage is employed for needle rollers the insert acts as a retainer for the cage which in turn retains the rollers.

Prior art bearings utilizing seals touching the outer race flange are known.

In the preferred form of the invention the insert is made of a metal but other low friction, hard, surfaces may be employed.

An object of this invention is to provide an integral sealed needle bearing which keeps dirt out and the lubricant in.

Another object of this invention is to provide a cage retention device and seal which can be assembled with an interference fit into the bearing without scoring the race by virtue of the rubber contact.

A further object of this invention is to provide a cage retainer and seal which does not expand or produce undesired forces against the outer shell.

Still another object is to provide a thick cushion in the seal to absorb thrust due to misalignment or due to other factors which tend to skew the rollers.

Yet another object is to provide a sealed needle bearing in which desired tolerances can be more easily achieved and maintained.

Another object is to permit easy entry assembly of shaft into bearing without damage to the seal lip.

A further object is to have a simple retainer-seal in a bearing.

An object of this invention is to make a bearing with a seal having the foregoing characteristics.

The above mentioned and other features and objects of this invention and the manner of attaining them will become more apparent and the invention itself will best be understood by reference to the following description of embodiments of the invention taken in conjunction with the accompanying drawings wherein.

Figure 1:
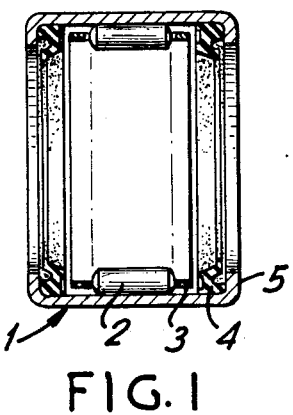
FIG. 1 is a sectional view of the needle roller bearing having an integral retainer seal in accordance with the principles of this invention.
Figure 2:
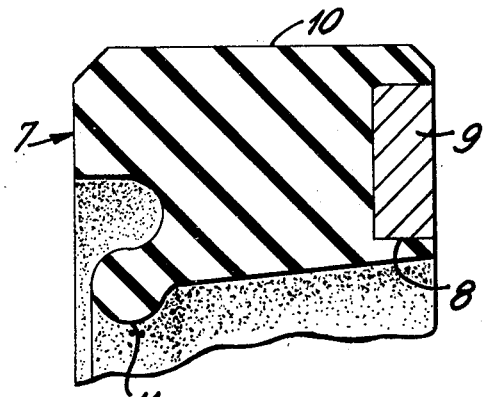
FIG. 2 is an enlarged view of one form of seal and insert.

Referring now to FIG. 1, there is shown a shell 1 and needle rollers 2 retained within a cage 3. Seal 4 is positioned against the flanges 5 and closely adjacent to the cage. In FIG. 2 the seal is shown as comprising a rubber body 7 having a recess 8 in which a hardened insert 9 is bonded or otherwise fixed in position. It will be noted that the entire resilient surface of the seal, and particularly that area above insert 9, is formed of resilient material which bears against the outer shell. The bottom of the seal is shaped as to provide a flexible lip such as the ball shaped address 11 of FIG. 2.

The insert is made of hard material, preferably steel, and presents the riding surface for the bearing. It may have a hard low friction surface above 40 Rockwell "C" scale, and preferably about 50. If the hardness is below the stated 40 Rockwell, the material will wear fast causing premature bearing failure.

A particular advantage of the ball 11 is that when the needle bearing assembled with seals is mounted on the shaft the seal lip, ball 11 in this case will slide easily over the shaft without "tucking" backwards as might occur with a sharp cornered seal lip.

Figure 2A:
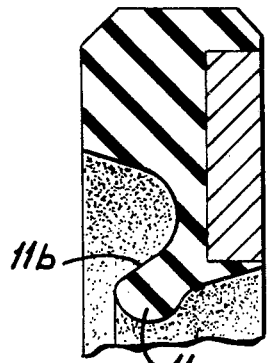
FIG. 2A is a modification of the embodiment of FIG. 2.

In FIG. 2A, the address 11A has a curved semicircular lower surface, but the upper extending region has been reduced to provide greater flexibility. In this embodiment, it will be clear that the entire address pivots or is cammed upwardly when a cage or other means is inserted.

Figure 2B:
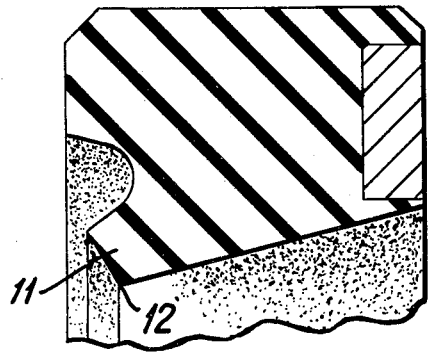
FIG. 2B is another modification of the embodiment of FIG. 2.

In the embodiment of FIG. 2B, the address 11 has an angled undersurface, but still when the outermost section 12 receives a cage or other means, the entire address is cammed upwardly.

Figure 5:
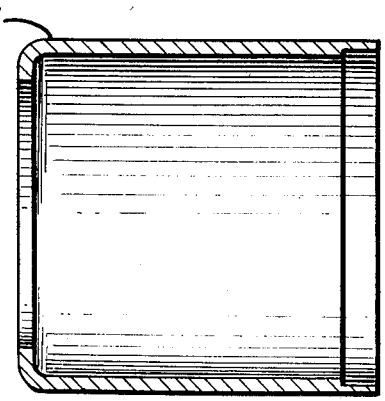
FIG. 5 is a section diagram of the outer shell during the preliminary stages of the assembly.

One of the advantages of this invention is derived from the ease of manufacture. As illustrated in FIG. 5, the outer cage is stamped initially with only a single flange and a seal of the type shown in FIG. 2 or any other embodiment is pressed all the way in as illustrated by the dotted lines. Thereafter the cage and/or needle assembly are placed into the shell and an additional seal is placed at the other end and the flange is then turned inwardly. Lubricants may be added at those stages which are believed desirable, as those skilled in the art will recognize.

Figure 3:
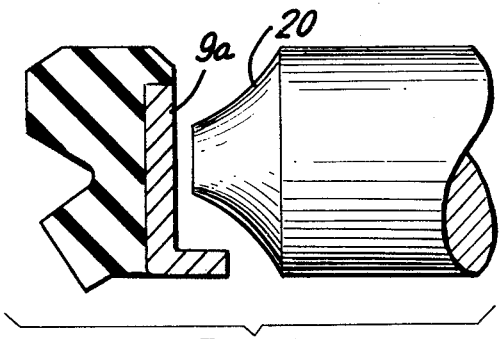
FIG. 3 is an embodiment of this invention in which a cage is absent.
Figure 3A:
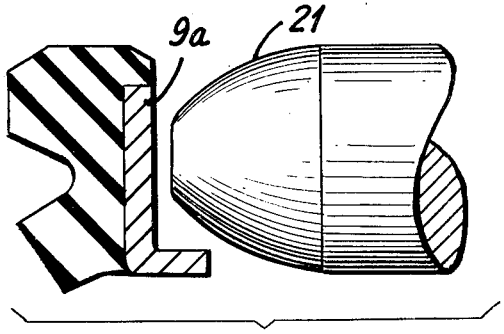
FIG. 3A is an alternate embodiment of FIG. 3 illustrating a different type of bearing roller in connection with the retainer-seal.

In the embodiments of FIGS. 3 and 3A, the hardened insert retainer 9A is substantially L-shaped and the horizontal arm guides a dumbbell type roller 20 of FIG. 3 or a conical shaped roller 21 of FIG. 3A. In each case, the roller end may contact the horizontal arm, and may even ride against or be retained by the vertical leg of the insert. All vibrations, shocks and the like are cushioned by the elastic material and the shell is kept resiliently spaced from the hardened insert.

Figure 4:
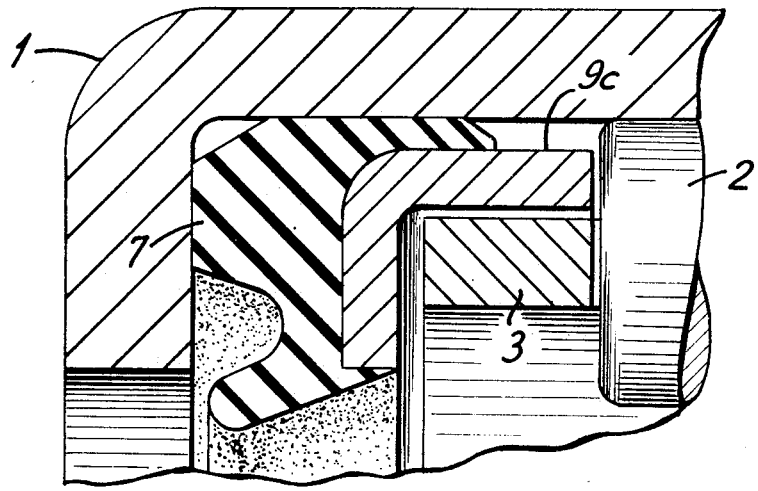
FIGS. 4 and 4A illustrate different forms of the integral retainer seal.
Figure 4A:
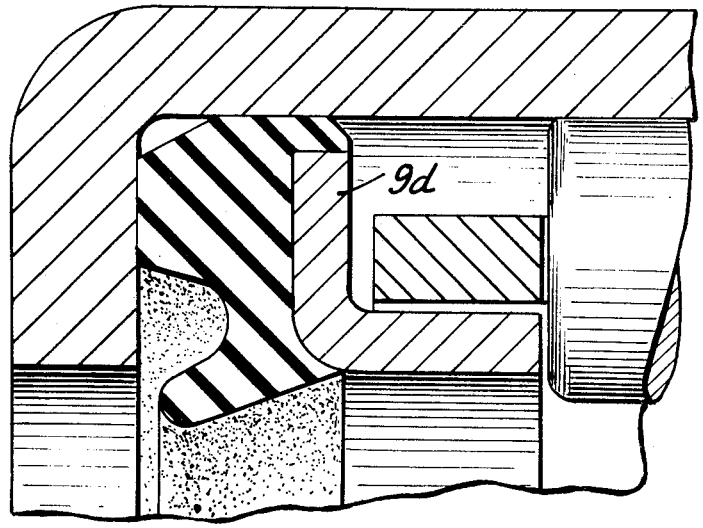

In FIG. 4, the insert retainer 9C is similar to that of FIG. 3, but here the horizontal arm supports the cage 3. The cage thus pilots on the insert and the shell is kept resiliently spaced. In FIG. 4A, the retainer is positioned to present the horizontal arm above the cage, but the cage still pilots on the insert.

As is also readily understood by those skilled in the art, bearings can be made with only one seal.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. In a method of making a needle roller bearing comprising the steps of:
    forming an outer shell of said bearing to provide a cylindrical body and a single integral flange extending radially inwardly;
    providing an elastomeric seal having a radially outer surface of generally cylindrical contour and of diameter substantially equal to the inner diameter of said shell but still capable of providing an interference fit, said seal having a recess in an axial surface, and a hardened insert bonded in place in said recess, the elastomeric material supporting said insert on its radial outer and inner surfaces, said elastomeric seal having an axial thickness substantially greater than said insert and said flange, whereby cushioning effects may be provided;
    inserting said seal into the bore of said shell and against said flange;
    inserting the roller elements into the said bore; and forming the second flange.

2. The method of claim 1 including the step of inserting a second seal having an insert and forming a second flange, said second seal being positioned abutting said second flange.

3. The method of claim 1 including the step of inserting a cage along with said roller elements.

References Cited

UNITED STATES PATENTS

| | | | |
|---|---|---|---|
| 2,928,701 | 3/1960 | Ferdig | 308—190 |
| 3,046,064 | 7/1962 | Schaeffler | 308—212 |
| 3,177,559 | 4/1965 | Boschi et al. | |
| 3,204,323 | 9/1965 | Schaeffler. | |
| 3,348,889 | 10/1967 | Schaeffler | 308—187.2 |

THOMAS H. EAGER, Primary Examiner

U.S. Cl. X.R.

29—434